(12) United States Patent
Eom

(10) Patent No.: US 6,975,636 B2
(45) Date of Patent: Dec. 13, 2005

(54) VOICE OVER INTERNET PROTOCOL GATEWAY SYSTEM AND METHOD THEREFOR

(75) Inventor: Min Young Eom, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 812 days.

(21) Appl. No.: 09/898,293

(22) Filed: Jul. 2, 2001

(65) Prior Publication Data

US 2002/0080773 A1  Jun. 27, 2002

(30) Foreign Application Priority Data

Dec. 21, 2000 (KR) .............................. 2000-79740

(51) Int. Cl.[7] .............................................. H04L 12/28
(52) U.S. Cl. ...................................... 370/401; 370/352
(58) Field of Search .............................. 370/352, 353, 370/354, 355, 356, 493, 494, 495, 401

(56) References Cited

U.S. PATENT DOCUMENTS 6,487,196 B1 * 11/2002 Verthein et al. ............ 370/352
6,526,581 B1 * 2/2003 Edson ......................... 725/74
6,785,267 B1 * 8/2004 Knappe ....................... 370/353
6,804,224 B1 * 10/2004 Schuster et al. ............ 370/352
2001/0024436 A1 * 9/2001 Barraclough et al. ....... 370/352
2002/0001302 A1 * 1/2002 Pickett ........................ 370/352

* cited by examiner

Primary Examiner—Duc Ho
Assistant Examiner—Thien D. Tran
(74) Attorney, Agent, or Firm—Lee, Hong, Degerman, Kang & Schmadeka

(57) ABSTRACT

A VoIP gateway system for use in the IP network comprises a plurality of voice processing units, each having a unique IP address and a main processing unit connected via a HUB. The voice processing units and the main processing unit share the local LAN for sending and receiving a voice data packet by connecting the PSTN and the IP network. The load concentration on the system bus is reduced, thus effectively increasing the number of lines which can be handled for one voice processing unit. When transferring a packet to the IP network, only the IP address of the main processing unit is managed by the gatekeeper, thus effectively performing the IP address management at the gatekeeper.

23 Claims, 8 Drawing Sheets

VOICE OVER INTERNET PROTOCOL GATEWAY SYSTEM AND METHOD THEREFOR

CROSS REFERENCE TO RELATED ART

This application claims the benefit of Korean Patent Application No. 2000-79740, filed on Dec. 21, 2000, which is hereby incorporated by reference in its entirety.

BACKGROUND OF THE INVENTION

1. Field of the Invention

The present invention relates to a VoIP (Voice Over Internet Protocol) system which is capable of sending and receiving voice data via an IP network (Internet Protocol Network), and more particularly, to a VoIP gateway system gateway which increases the number of processing lines of a voice processing unit by distributing the load of a system bus in a gateway system for sending and receiving a voice data packet by connecting a PSTN (Public Switched Telephone Network) and an IP network, and which makes a gatekeeper manage only an IP address of a main processor by batch-processing a process for forming a H.323 protocol stack on a main processing unit when a voice data packet is transferred to the IP network, for thereby performing the IP address management at the gatekeeper effectively.

2. Discussion of the Related Art

In the VoIP system, voice data can be sent and received via the IP network. In particular, the IP network and the PSTN are connected through a gateway. The gateway converts a PCM (Pulse Code Modulation) voice data applied from the PSTN into a packet to transfer it to the IP network. Conversely, when the packet is received from the IP network, the corresponding packet is converted into PCM voice data to be transferred to the PSTN.

The gateway of such a conventional VoIP system is provided with a main processing unit and a plurality of voice processing units, with the corresponding voice processing unit and the main processing unit being connected with each other via a system bus. The voice processing unit performs both RTP/TCRP (Real Time Transport Protocol/Real Time Transport Control Protocol) and video/audio transmission protocol stacking, such as the H.323 protocol.

A voice data packet is transferred in the following way. When the voice processing unit converts voice into a packet and transfers it to the main processing unit via the system bus by forming a H.323 protocol stack. The main processing unit receives the corresponding H.323 protocol stack to transfer it to the IP network through a router.

As described above, in the gateway of the prior art VoIP system, since the voice processing unit and the main processing unit sends and receives information with each other only via the system bus, the load is concentrated on the system bus. Thus, the number of telephone lines which can be handled for one voice processing unit is limited to a maximum of 30. In the case of transferring a packet to the IP network, since the process for forming a H.323 protocol stack is performed by each voice processing unit, each of that voice processing unit has to be given an IP address for discrimination. Therefore, the number of IP addresses managed by the gatekeeper increases, thereby disabling an effective IP address management in the gatekeeper.

SUMMARY OF THE INVENTION

Accordingly, the present invention is directed to a VoIP gateway system and method therefor that substantially obviate one or more of the problems due to limitations and disadvantages of the related art.

It is an object of the present invention to provide a method for transferring a packet in a VoIP system gateway which increases the number of processing lines of a voice processing unit by distributing the load of a system bus in a gateway for sending and receiving a voice data packet by connecting a PSTN and an IP network.

It is another object of the present invention to allow a gatekeeper to manage only one IP address of a main processing unit by batch-processing a process for forming a H.323 protocol stack on a main processing unit when a voice data packet is transferred to the IP network, thereby effectively performing the IP address management by the gatekeeper.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve at least the above objects in whole or in parts, there is provided a method for transferring a packet in a VoIP system gateway is provided, the method comprising the steps of: converting a PCM voice data applied from a PSTN into a packet by a voice processing unit, transferring the packet to a main processing unit through a local LAN to form a predetermined protocol stack, and transferring the packet to the IP network; receiving the packet applied from the IP network by the processor board to separate the predetermined protocol stack from the packet, and transferring the packet to the voice processing unit through the local LAN; and transferring the packet to the PSTN after converting into a PCM data by the voice processing unit.

The process of transferring the packet comprises the steps of: encoding, at the voice processing unit, the PCM data received from the PSTN in a predetermined format; converting the encoded data into the packet and transferring to the main processing unit through the local LAN; receiving, at the main processing unit, the packet transferred from the voice processing unit through the local LAN and forming the predetermined protocol stack; and outputting the packet formed by the protocol stack through the LAN and transferring to the IP network via a HUB and router.

The step of receiving the packet comprises the steps of: receiving, at the main processing unit, the packet applied from the IP network through a router and a HUB; separating, at the main processing unit, the predetermined protocol stack of the received packet and transferring a voice packet to the voice processing unit through the local LAN; separating, at the voice processing unit, the transferred voice packet into the predetermined format; and converting the separated packet into the PCM data and transferring to the PSTN.

According to the preferred embodiment of the present invention, a gateway system for use in a communication network for communicating PCM data with a remote system connected to the communication network comprises a plurality of voice processing units, each voice processing unit having a unique IP address and preparing compressed data from the PCM data and further converting the compressed data into packets; a HUB in communication with the plurality of voice processing units; and a main processing unit in communication with the plurality of voice processing units and the HUB, the main processing unit having a main IP address for communicating with the remote system. The main processing unit receives the unique IP addresses of the plurality of voice processing units and the packets and converts the packets into a protocol stack for communicating on the communication network and uses the main IP address in lieu of the unique IP addresses of the voice processing units in the protocol stack.

According to one aspect of the present invention, each one of the plurality of voice processing units preferably uses G.723.1 or G.729 standard protocol to compress the PCM data. In addition, the packets are converted into the protocol stack by preferably using the H.323 standard protocol.

According to another aspect of the present invention, the plurality of voice processing units are in communication with the HUB using Ethernet connections. The main processing unit comprises a central processing unit, a memory, a HUB interface device, a router interface device and a dual port memory connected to the central processing unit. The dual port memory is in communication with the plurality of voice processing units through the HUB and stores the unique IP addresses of the plurality of voice processing units.

According to another aspect of the present invention, the main processing unit comprises: a LAN interface module executed at the main processing unit for receiving the packets and the unique IP addresses from the plurality of voice processing units; a protocol stack reassemble module executed at the main processing unit for converting the packet into the protocol stack; and a router interface module executed at the main processing unit for transmitting the protocol stack to the communication network with the main IP address of the main processing unit.

According to the preferred embodiment of the present invention, the gateway system comprising: a plurality of voice processing units, each voice processing unit having a unique IP address and preparing packets received from the remote system into compressed data and further preparing the compressed data into PCM data; a HUB in communication with the plurality of voice processing units; and a main processing unit in communication with the plurality of voice processing units and the HUB, the main processing unit having a main IP address for communicating with the remote system. The main processing unit receives a protocol stack from the remote system, disassemble the protocol stack into the packets, and selects idling voice processing unit and sends the packets with the unique IP address corresponding to the idling voice processing unit.

It is to be understood that both the foregoing general description and the following detailed description are exemplary and explanatory and are intended to provide a further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF THE PREFERRED EMBODIMENTS

A preferred embodiment of the present invention will now be described with reference to the accompanying drawings. In the following description, reference is made to the accompanying drawings which form a part hereof and which illustrate the preferred embodiment of the present invention. It is understood that other embodiments may be utilized and structural and operational changes may be made without departing from the scope of the present invention. It is further understood that although the present invention is described using the IP network, the present invention may be also used in any packet-based networks, such as Internet packet exchange (IPX) based local area network.

Figure 1:
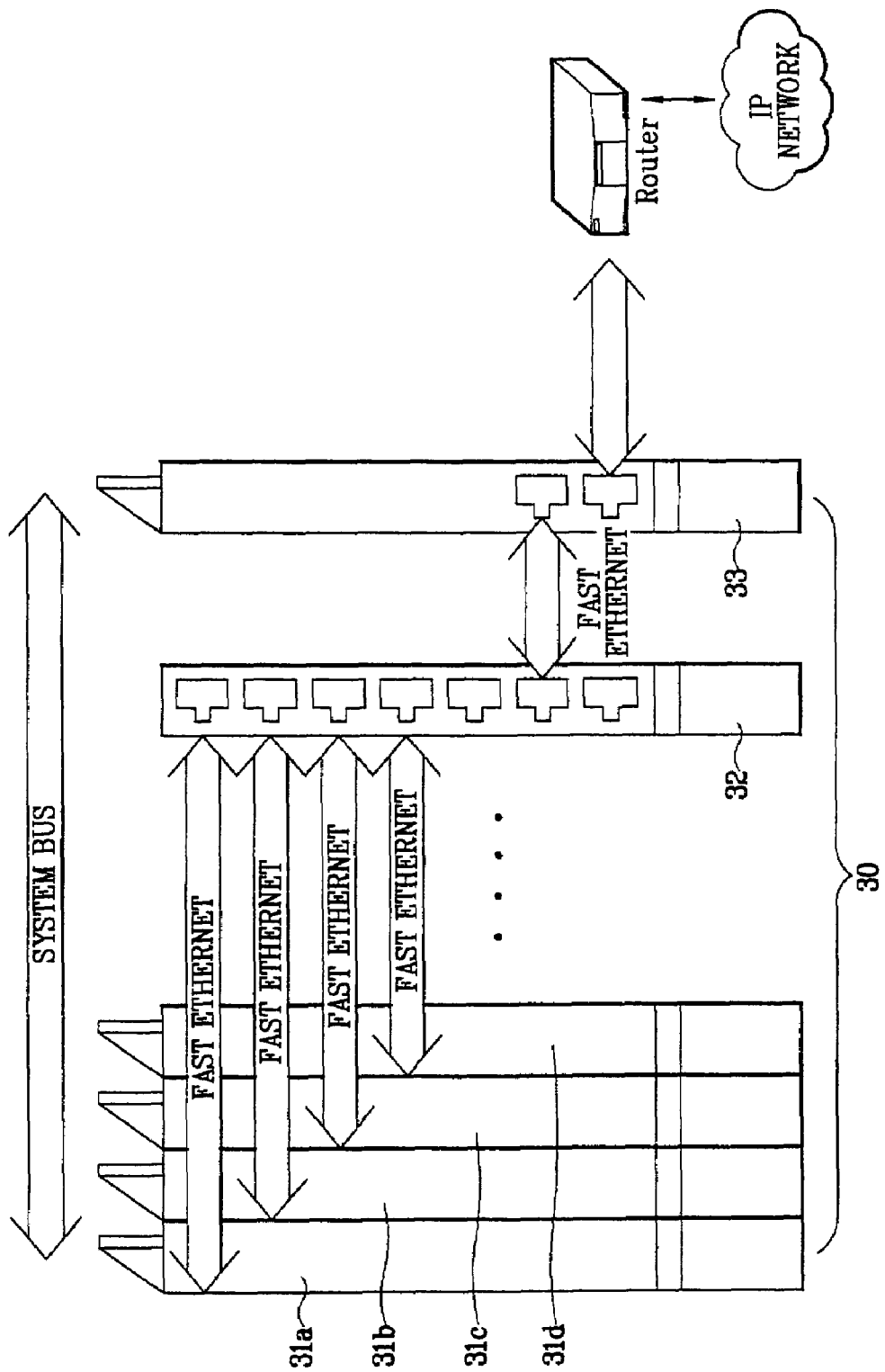
FIG. 1 illustrates the schematic diagram of the VoIP gateway system according to the preferred embodiment of the present invention.

The VoIP gateway system in accordance with the preferred embodiment of the present invention has the following construction as illustrated in FIG. 1. Referring to FIG. 1, the gateway system 30 includes a plurality of voice processing units 31a to 31d (also known as vocoder or Digital Signal Processing unit), a main processing unit 32 and a HUB 33. The voice processing units 31a to 31d and the main processing unit 32 are in communication with each other using preferably a system bus, such as fast Ethernet. The main processing unit 32 is in communication with the HUB 33 preferably through a LAN (Local Area Network). The HUB 33 is in communication with a router through the LAN.

Figure 2:
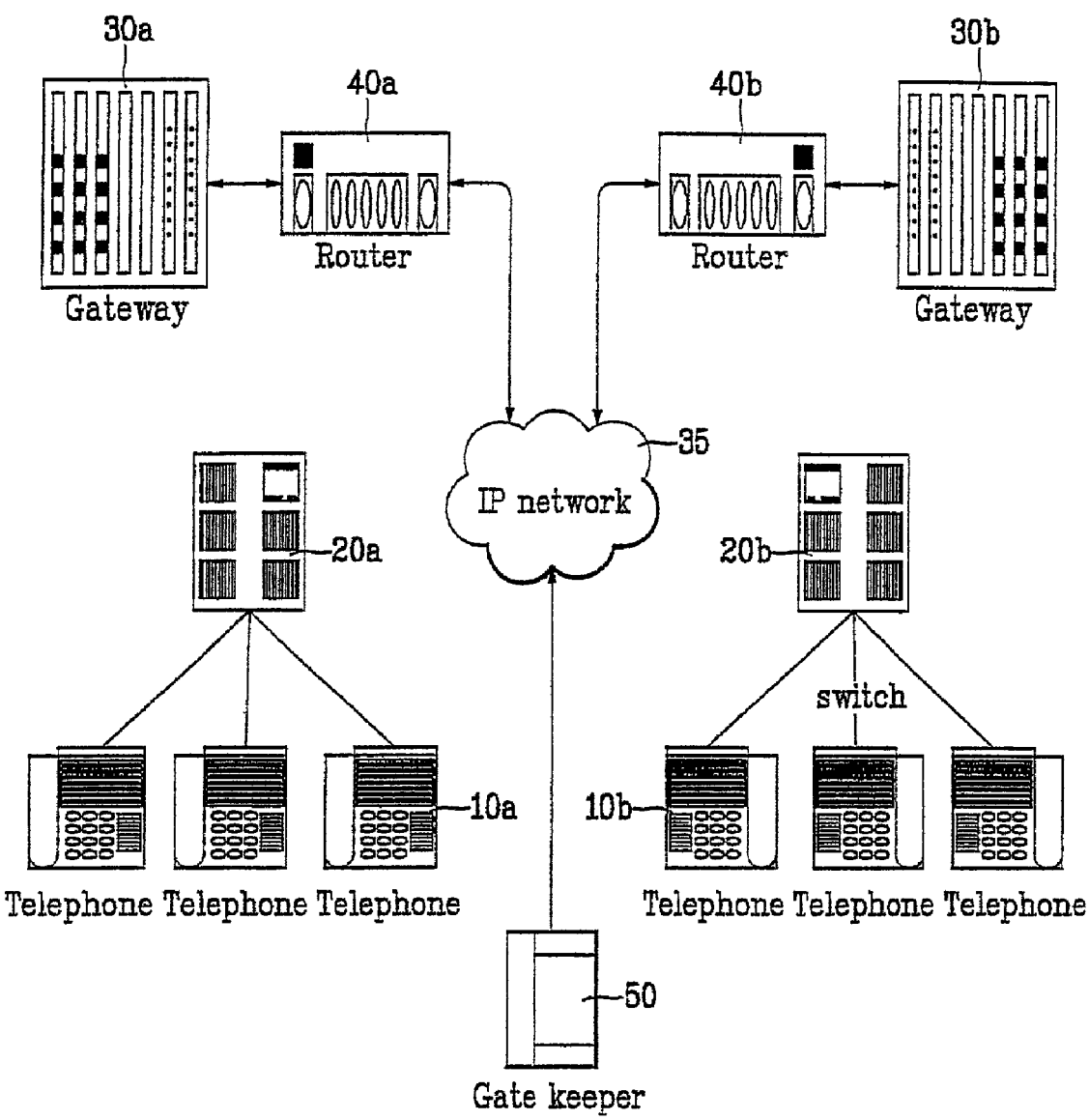
FIG. 2 illustrates the application of the VoIP gateway system used in a communication network, such as the IP network, according to the preferred embodiment of the present invention.

The voice processing units 31a to 31d and the main processor unit 32 share, preferably, the fast Ethernet, and also share the system bus. A VPN (Virtual LAN) consists of an IP used in the gateway 30 and a HUB 33 interfaces with an external network. A gatekeeper 50, shown in FIG. 2, is configured to manage only the IP address of the main processor module 32. Particularly, the main processor module 32 processes the packet applied from the IP network via the HUB 33 as well as the packet applied from the voice processing units 31a to 31d.

Each one of the voice processing units 31a to 31d encodes PCM data applied from the PSTN and prepares compressed data using a audio/video/data compression algorithm, such as G.723.1 (5.3 and 6.3 kbps) or G.729 (8 kbps) standard or other suitable compression algorithm known to one of ordinary skill in the art. The compressed data is converted to a data packet and transferred to the main processing unit 32 through the local LAN configured as the fast Ethernet. The main processing unit 32 processes the packet applied from the voice processing units 31a to 31d through the local LAN to form a protocol stack and transfers it to the IP network through the HUB 33 via the router (refer to FIG. 2). The protocol stack is based preferably on the H.323 standard. The H.323 standard sets forth the transmission of real time audio/video/data communication over the packet-based network. The main processing unit 32 reduces the load of the system bus by having two LAN ports and performing the sending and receiving of a packet through the LAN. Also, in the system having a small bandwidth of the system bus, 60 through 120 channels per voice processing unit can be processed.

In addition, the packet applied through the router and the HUB 33 from the IP network is transferred to the main processing unit 32. The main processing unit 32 extracts a voice packet from the corresponding H.323 protocol stack by separating the H.323 protocol stack from the corresponding packet, and transfers it to the voice processing units 31a through 31d via the local LAN configured as the fast Ethernet. The voice processing units 31a through 31d separates the corresponding voice packet into the recommended G.723.1 or G.729 and converts the packet into a PCM data to transfer the PCM data to the PSTN.

FIG. 2 illustrates an application of the VoIP gateway system used in a communication network, such as the IP network 35, according to the preferred embodiment of the present invention. The network system shown in FIG. 2 comprises a PSTN system comprising a plurality of telephones 10a and 10b connected to switches 20a and 20b. The PSTN system is connected to the IP network 35 via VoIP gateways 30a and 30b and routers 40a and 40b. The gatekeeper 50 is preferably connected to the IP network 35 to manage addressing, authentication, bandwidths and accounts and provides a call routing service. That is, the gateway 30 described in FIG. 1 corresponds to the gateway 30a and 30b, and sends and receives a voice packet by connecting to the PSTN and the IP network 35.

Figure 3:
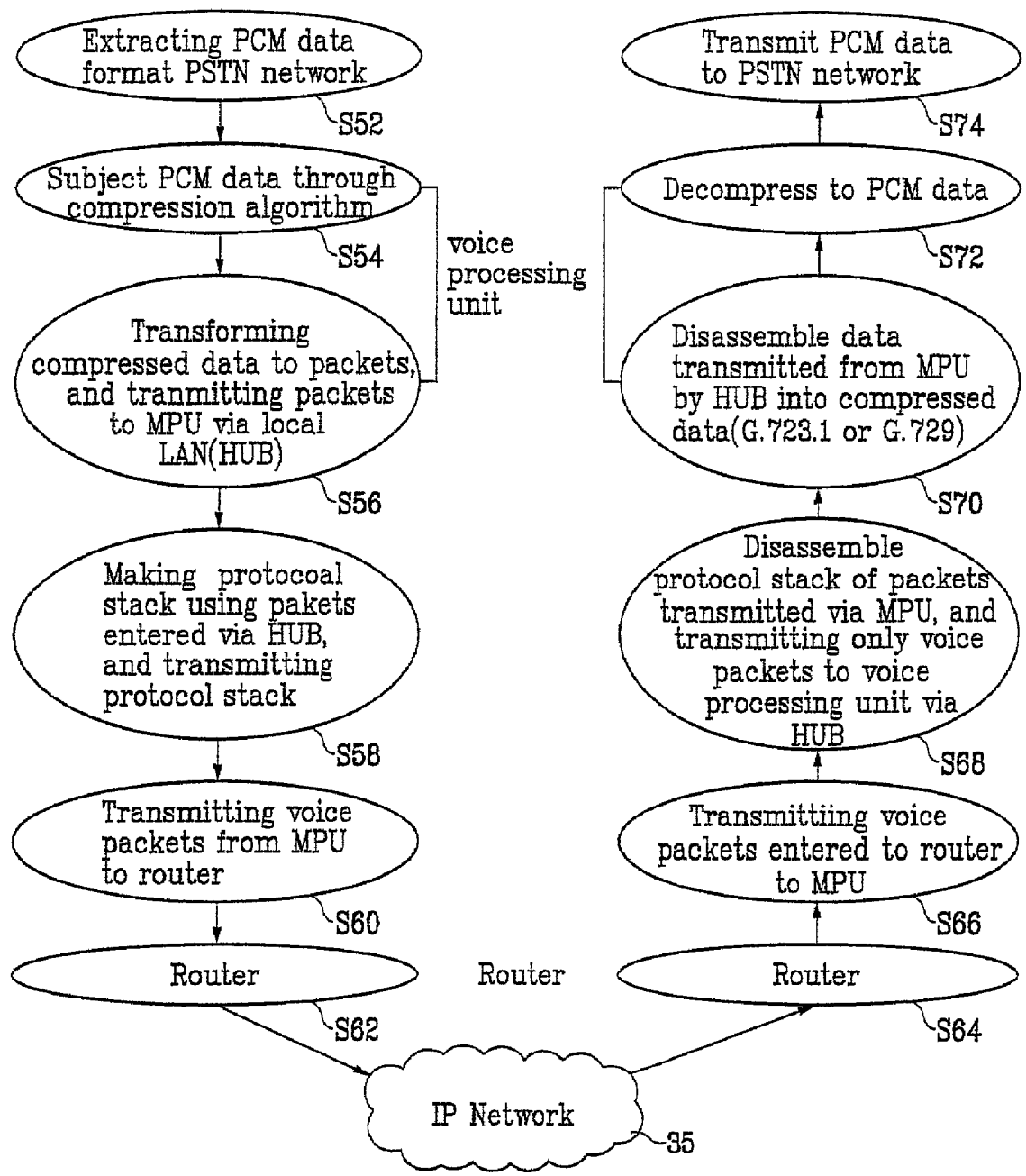
FIG. 3 illustrates a schematic diagram showing a sample data flow using the network shown in FIG. 2.

FIG. 3 illustrates a schematic diagram showing a sample data flow using the network shown in FIG. 2. Referring to FIG. 3, the PCM data is provided from the PSTN network in step S52, which is compressed using a data compression algorithm, such as the G.723.1 or G.729 protocol in step S54. The compressed data is converted into one or more data packets in the voice processing units in step S56. The voice processing unit is also known as vocoder. In addition in step S56, the packets are then provided to the main processing unit 32 through the local HUB which is in communication with the main processing unit 32 through the local LAN, preferably fast Ethernet or other suitable network known to one of ordinary skill in the art.

The main processing unit 32 forms a protocol stack with the packets using a suitable video/audio/data transmission protocol, such as the H.323 standard, in step S58. The protocol stack is transferred to a router in steps S60 and S62. The router transfers the data through the IP network 35 which is then received by another router (a remote system) in step S64. The packets received from the router is forwarded to the main processing unit in step S66. The information received by the main processing unit is decoded using, preferably, the H.323 standard and preferably only the voice packets are sent to the voice processing units in step S68. Thereafter, the voice packets are decompressed using a data decompression algorithm, such as the G.723.1 or G.729 protocol in step S70 to obtain the PCM data. The PCM data are sent to the PSTN network in step S74.

Figure 4:
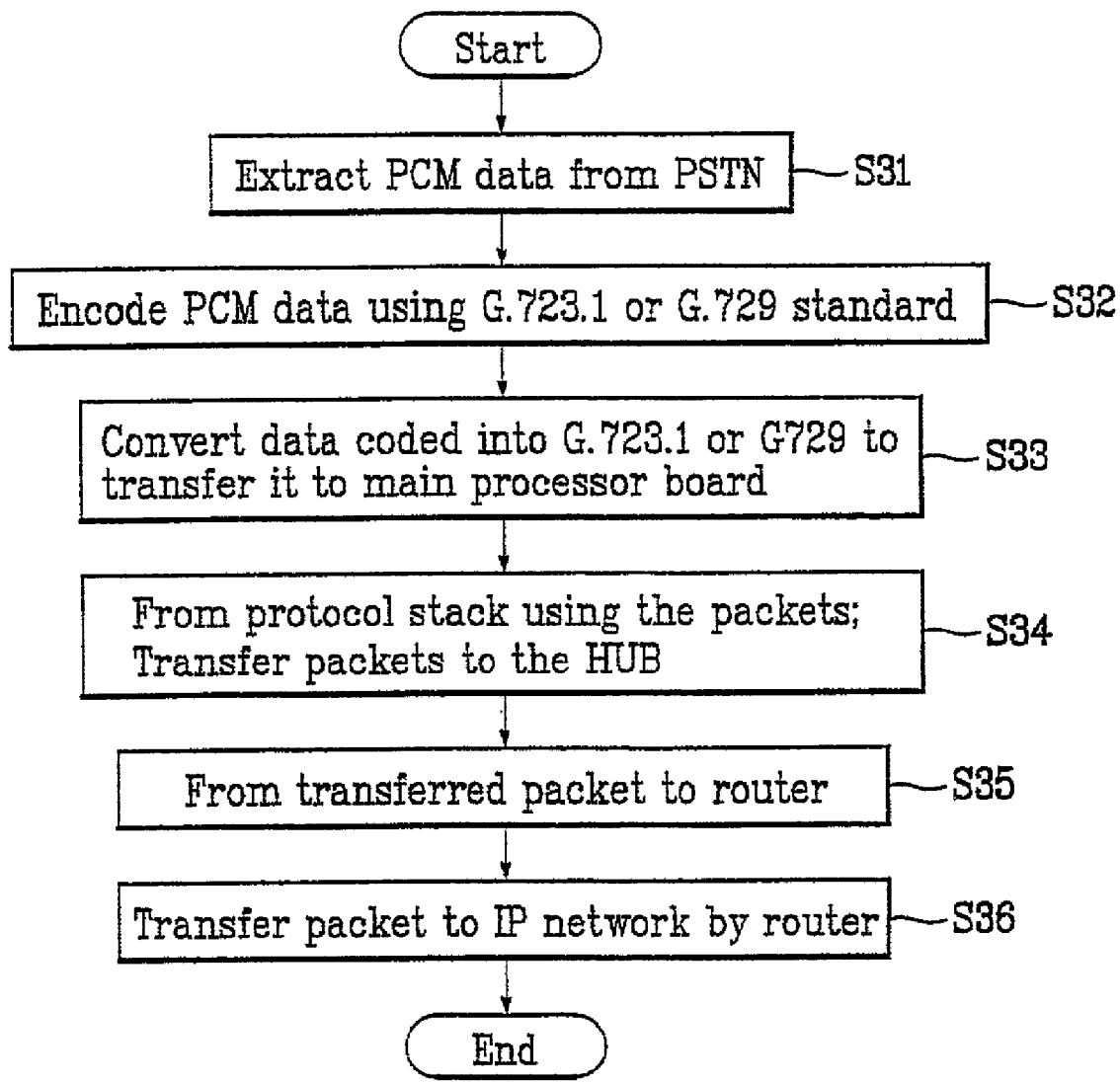
FIG. 4 illustrates a flow chart showing a process for sending a packet from the gateway to an IP network in accordance with the present invention.
Figure 5:
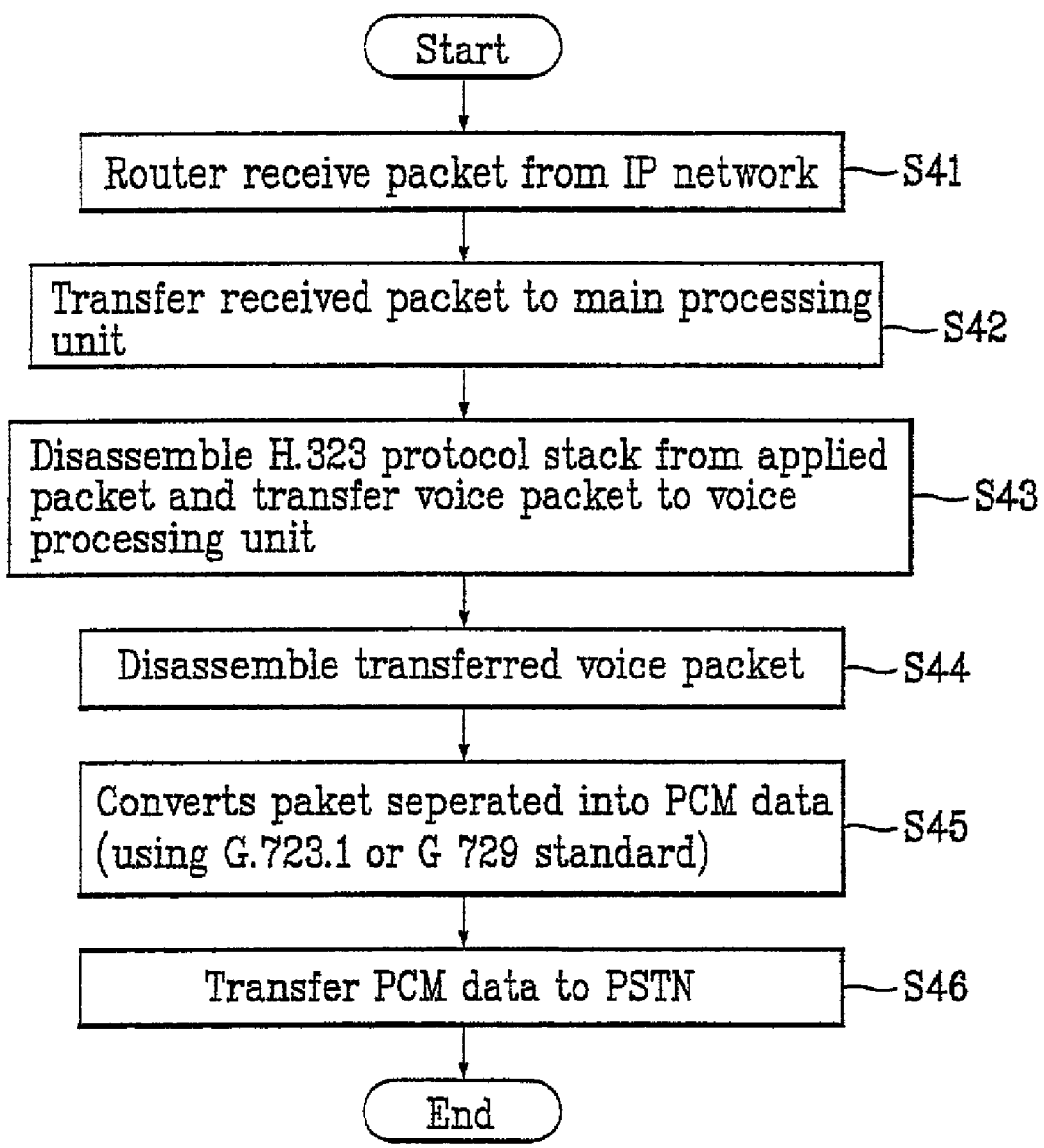
FIG. 5 illustrates a flow chart showing a process for receiving a packet from the IP network to the gateway.

FIG. 4 illustrates a flow chart of the transmission end of the voice processing in the VoIP gateway system according to the preferred embodiment of the present invention. FIG. 5 illustrates a flow chart of the receiving end of the voice processing in the VoIP gateway system according to the preferred embodiment of the present invention.

Firstly, the voice transferred from the telephone 10a is applied to the switch 20a, and thus a PCM data is extracted from the PSTN to be transferred to the gateway 30a in S31. At this time, the voice processing units 31a through 31d of the gateway 30a encodes the received PCM data into the recommended G.723.1 or G.729 in step S32. The data encoded into the recommended G.723 or G.729 standard is converted into a packet and is transferred to the main processing unit 32 via the local LAN configured as the fast Ethernet in step S33. The main processing unit 32 receives the packet transferred from the voice processing units 31a through 31d through the local LAN to form a H.323 protocol stack and transfers it to the HUB 33 through the LAN in step S34. The HUB 33 transfers the packet transferred from the main processing unit 32 to the router 40a in step S35. Accordingly, the router 40a transfers the packet received from the HUB 33 to the IP network in step S36, and the corresponding transferred packet is received by the router 40b of the other party via the IP network to be transferred to the gateway 30b. The gateway 30a transfers the PCM data extracted by processing the corresponding packet to the telephone 10b of the other party via the switch 20b, thereby transferring a voice data to the telephone of the other party.

In the case where the VoIP gateway system of the present invention receives a voice packet applied from the IP network, the process as illustrated in FIG. 4 is performed. For example, the gateway 30a in the VoIP system of FIG. 2 receives the voice packet applied from the IP network to transfer it to the telephone 10a connected to the switch 20a of the PSTN.

When the router 40a receives the packet applied from the IP network in step S41, the corresponding received packet is transferred to the gateway 30a, and then is transferred to the main processing unit 32 through the HUB 33 of the gateway 30a in step S42. The main processing unit 32 separates the H.323 protocol stack from the packet applied through the HUB 33 and transfers it to the voice processing units 31a through 31d through the local LAN configured as the fast Ethernet in step S43. The voice processing units 31a through 31d disassembles the voice packet transferred from the main processing unit 32 into the recommended format according to the G.723.1 or G.729 standard in step S44, converts the packet, according to the recommended G.723.1 or G.729 standard, into a PCM data in step S45 to transfer it to the switch 20a of the PSTN in step S46, thereby transferring the voice to the telephone 10a by the switch 20a.

Figure 6:
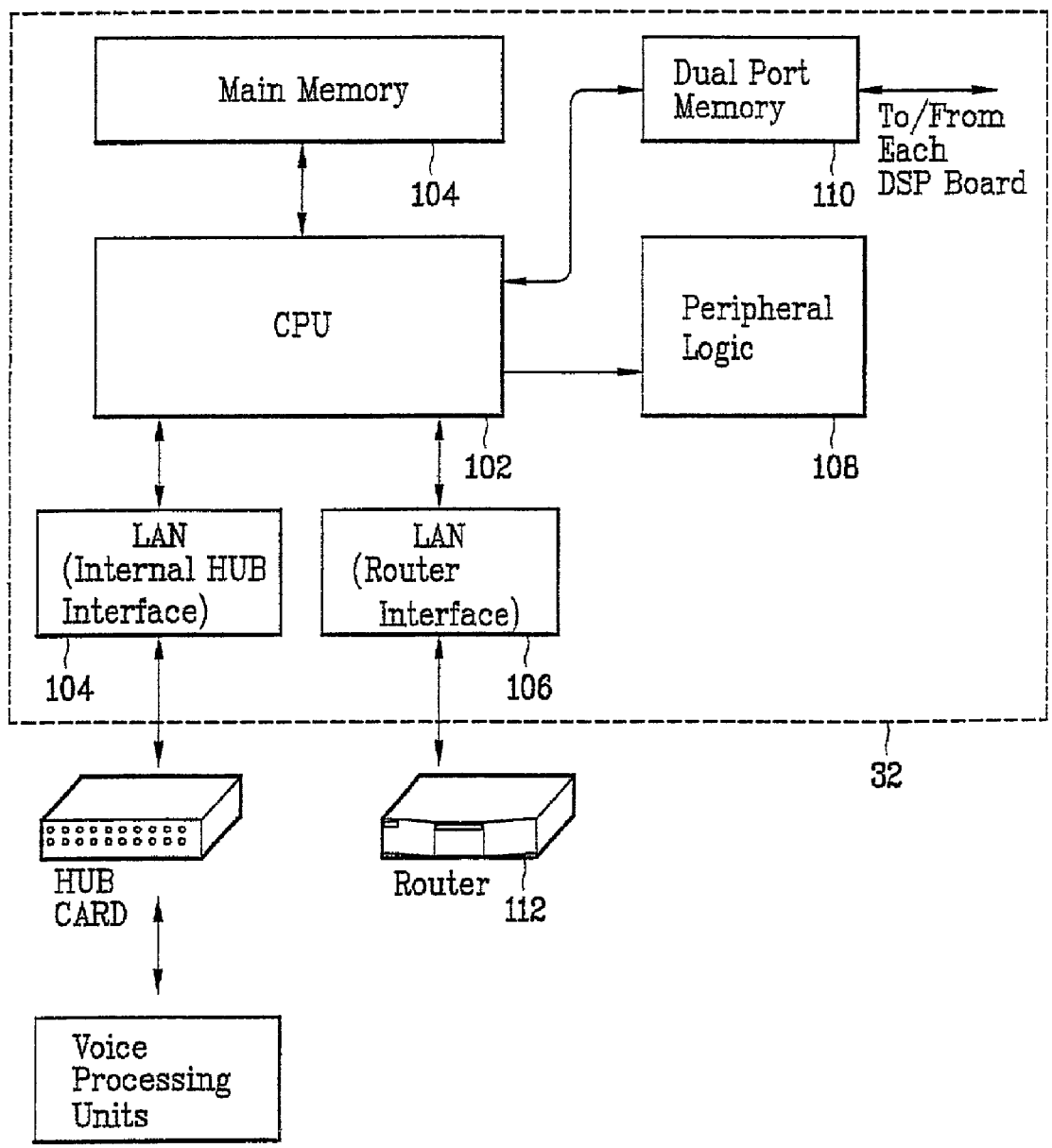
FIG. 6 illustrates the main processing unit of the VoIP gateway system according to the preferred embodiment of the present invention.

FIG. 6 illustrates the main processing unit 32 of the VoIP gateway system according to the preferred embodiment of the present invention. Referring the FIG. 6, the main processing unit 32 comprises a central processing unit (CPU), a main memory 104 connected to the CPU 102. The main processing unit 32 also includes a dual port memory 110 for storing data received from and transmitted to the voice processing units 31a to 31b, as shown in FIG. 1. The dual port memory 110 also includes voice processing unit IP addresses and related information. The main processing unit 32 also includes a peripheral logic 108, such as boot-up ROM, and an internal HUB interface 104 and a router interface 106. The HUB interface 104 is in communication with the HUB card which is connected to the voice processing units 31*a* to 31*b*. The router interface 106 is in communication with the router.

Figure 7:
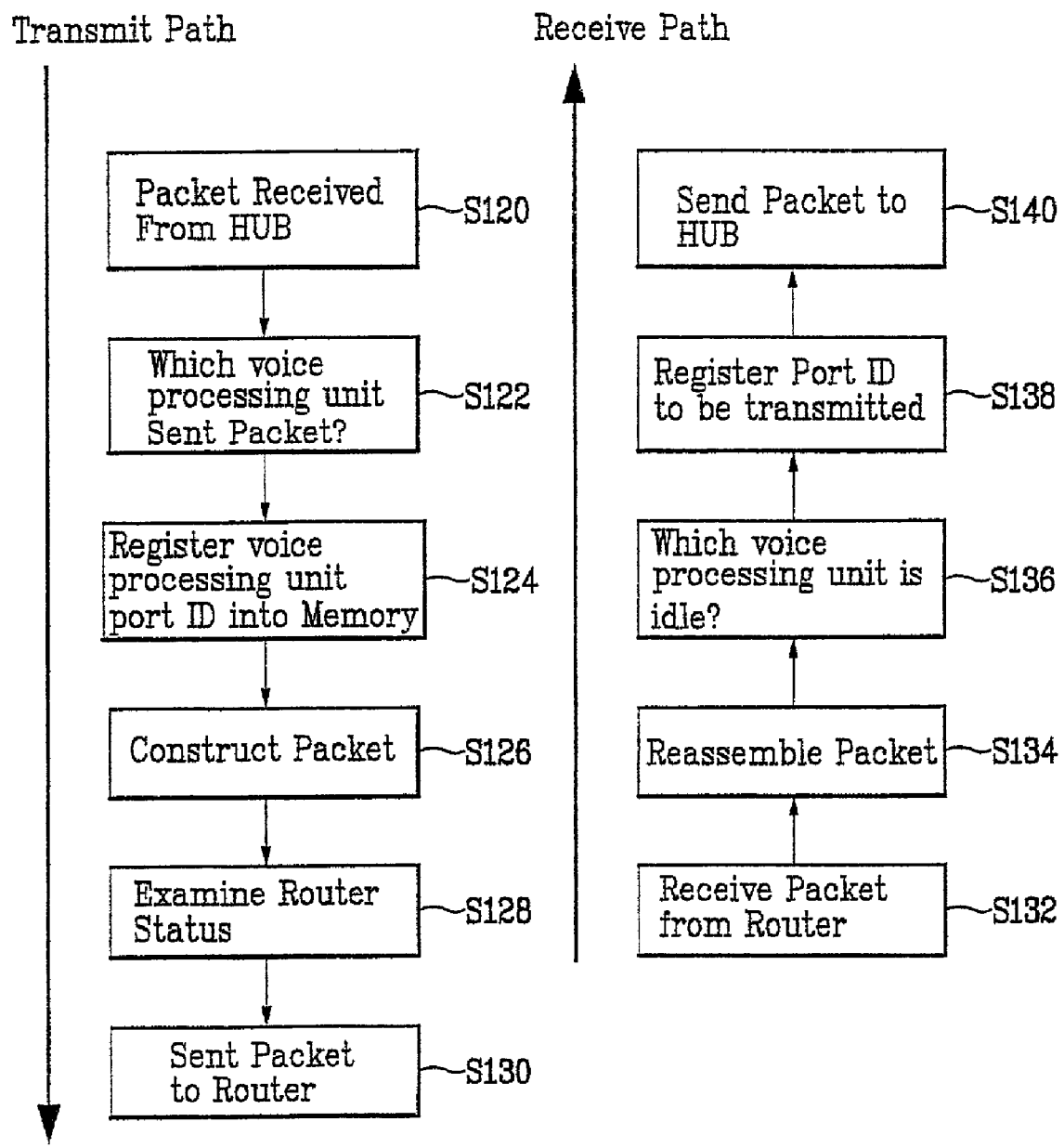
FIG. 7 illustrates the block diagram of the operation of the main processing unit of the VoIP gateway system according to the preferred embodiment.

FIG. 7 illustrates the block diagram of the operation of the main processing unit 32 of the VoIP gateway system according to the preferred embodiment. Referring to FIGS. 6 and 7, the main processing unit 32 receives packets from the HUB through the Internal HUB interface 104 in step S120. The packets are stored in the dual port memory 110 with the IP address of the voice processing unit that transmitted the packet. The CPU 102 of the main processing unit 32 then determines which voice processing unit has sent the packet in step S122. Upon determining the voice processing unit, the CPU 102 registers the voice processing unit port ID into the memory 104 in step S124. The CPU 102 then constructs the protocol stack packet 126 in step S126 and examines the router status in step S128. Then the packet is sent to the router 112 through the router interface 106 in step S130.

The reception process is subtantially the reversed of the transmission process described above. First, the protocol stack packet is received into the main memory 104 of the main processing unit 32 through the router interface 106 in step S132. The CPU reassembles or deassembles the packet in step S134. Then the CPU 102 determines which voice processing unit is in the idle mode in step S136. Upon finding the idle voice processing unit, the corresponding IP address of that idle voice processing unit is chose in step S138. The packet is then sent to the idle voice processing unit in step S140.

Figure 8:
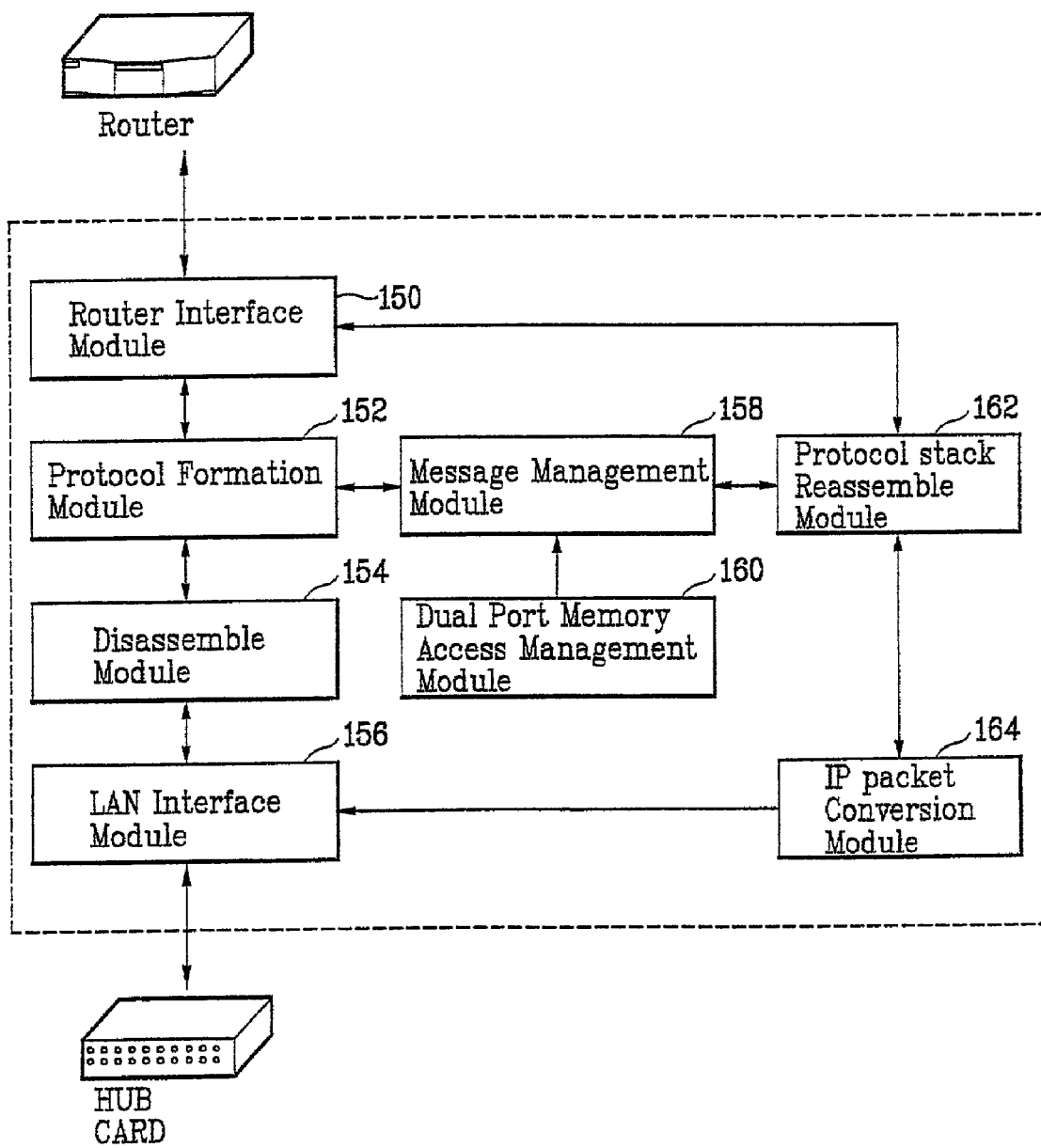
FIG. 8 illustrates the software component block diagram of the VoIP gateway system according to the preferred embodiment of the present invention.

FIG. 8 illustrates the software component block diagram of the VoIP gateway system according to the preferred embodiment of the present invention. Referring to FIG. 8, the VoIP gateway system includes the router interface module 150, protocol formation module 152, disassemble module 154, LAN interface module 156, message management 158, dual port memory access management module 160, protocol stack reassemble module 162 and IP packet conversion module 164.

According to the preferred embodiment, the router interface module 150 is responsible for transmitting and receiving the packet in the form of a protocol stack to and from the router. The protocol formation module 152 converts the packet into the protocol stack. The disassemble module 154 retrieves the voice related packets from the packets received from the voice processing unit. The LAN interface module 156 interfaces with the voice communication modules through the HUB. The LAN interface module 156 also processes IP addresses of the voice communication modules to selectively choose one of the plurality of the voice communication modules so that a single IP address of the VoIP gateway system is used to access a plurality of voice communication modules through the HUB. The message management module 158 processes data received from the dual port memory access management module 160 and manages the call related messages. The dual port memory access management module 160 periodically accesses the dual port memory and processes data received in the dual port memory from the voice processing units. The protocol stack reassemble module 162 obtains low bit rate data from the protocol stack received from the router. If there is any message contained in the protocol stack, such message is provided to the message management module 158. The IP packet conversion module 164 receives the low bit rate data from the protocol stack reassemble module 162 and turns such data into IP packets.

As described above, in the present invention, since the voice processing units 31*a* to 31*d* and the main processing unit 32 share the local LAN configured as the fast Ethernet in the gateway 30 for sending and receiving a voice data packet by connecting the PSTN and the IP network, load concentration on the system bus can be eliminated, thereby effectively increasing the number of lines which can be handled by one voice processing unit. In case of transferring a packet to the IP network, only the IP address of the main processing unit 32 is managed by the gatekeeper 50 by batch-processing the process for forming a H.323 protocol stack on the main processing unit 32, thereby effectively performing the IP address management at the gatekeeper 50.

The present invention increases the number of processing lines of a voice processing unit by distributing the load of a system bus in a gateway for sending and receiving a voice data packet by connecting a PSTN and an IP network. As a result, the gatekeeper manages only an IP address of the main processor unit by batch-processing a process for forming a H.323 protocol stack when a voice data packet is transferred to the IP network, thereby effectively performing the IP address management at the gatekeeper.

The foregoing embodiments and advantages are merely exemplary and are not to be construed as limiting the present invention. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A gateway system for use in a communication network for communicating PCM data with a remote system connected to the communication network, the gateway system comprising:
   a plurality of voice processing units, each voice processing unit having a unique IP address and preparing compressed data from the PCM data and further converting the compressed data into packets;
   a HUB in communication with the plurality of voice processing units; and
   a main processing unit in communication with the plurality of voice processing units and the HUB, the main processing unit having a main IP address for communicating with the remote system, wherein the main processing unit receives the unique IP addresses of the plurality of voice processing units and the packets and converts the packets into a protocol stack for communicating on the communication network and uses the main IP address in lieu of the unique IP addresses of the voice processing units in the protocol stack, the main processing unit comprises:
   a LAN interface module executed at the main processing unit for receiving the packets and the unique IP addresses from the plurality of voice processing units;
   a protocol stack reassemble module executed at the main processing unit for converting the packet into the protocol stack; and
   a router interface module executed at the main processing unit for transmitting the protocol stack to the communication network with the main IP address of the main processing unit.

2. The gateway system of claim 1, wherein each one of the plurality of voice processing units uses G.723.1 standard protocol to compress the PCM data.

3. The gateway system of claim 1, wherein each one of the plurality of voice processing units uses G.729 standard protocol to compress the PCM data.

4. The gateway system of claim 1, wherein the packets are converted into the protocol stack using H.323 standard protocol.

5. The gateway system of claim 1, wherein the plurality of voice processing units are in communication with the HUB using Ethernet connections.

6. The gateway system of claim 1, wherein the main processing unit comprises a central processing unit, a memory, a HUB interface device, a router interface device and a dual port memory connected to the central processing unit, wherein the dual port memory is in communication with the plurality of voice processing units through the HUB and stores the unique IP addresses of the plurality of voice processing units.

7. The method of claim 1, wherein the main processing unit comprises a central processing unit, a memory, a HUB interface device, a router interface device and a dual port memory connected to the central processing unit, wherein the dual port memory is in communication with the plurality of voice processing units through the HUB and stores the unique IP addresses of the plurality of voice processing units.

8. A gateway system for use in a communication network for communicating PCM data with a remote system connected to the communication network, the gateway system comprising:
a plurality of voice processing units, each voice processing unit having a unique IP address and preparing packets received from the remote system into compressed data and further preparing the compressed data into PCM data;
a HUB in communication with the plurality of voice processing units; and
a main processing unit in communication with the plurality of voice processing units and the HUB, the main processing unit having a main IP address for communicating with the remote system, wherein the main processing unit receives a protocol stack from the remote system, disassemble the protocol stack into the packets, and selects idling voice processing unit and sends the packets with the unique IP address corresponding to the idling voice processing unit, wherein the main processing unit comprises a central processing unit, a memory, a HUB interface device, a router interface device and a dual port memory connected to the central processing unit, wherein the dual port memory is in communication with the plurality of voice processing units through the HUB and stores the unique IP addresses of the plurality of voice processing units.

9. The gateway system of claim 8, wherein each one of the plurality of voice processing units uses G.723.1 standard protocol to decompress the compressed data into the PCM data.

10. The gateway system of claim 8, wherein each one of the plurality of voice processing units uses G.729 standard protocol to decompress the compressed data into the PCM data.

11. The gateway system of claim 8, wherein the protocol stack is converted into the packets using H.323 standard protocol.

12. The gateway system of claim 8, wherein the plurality of voice processing units are in communication with the HUB using Ethernet connections.

13. A gateway system for use in a communication network for communicating PCM data with a remote system connected to the communication network, the gateway system comprising:
a plurality of voice processing units, each voice processing unit having a unique IP address and preparing packets received from the remote system into compressed data and further preparing the compressed data into PCM data;
a HUB in communication with the plurality of voice processing units; and
a main processing unit in communication with the plurality of voice processing units and the HUB, the main processing unit having a main IP address for communicating with the remote system, wherein the main processing unit receives a protocol stack from the remote system, disassemble the protocol stack into the packets, and selects idling voice processing unit and sends the packets with the unique IP address corresponding to the idling voice processing unit, wherein the main processing unit comprises:
a router interface module executed at the main processing unit for receiving the protocol stack from the communication network with the main IP address of the main processing unit,
a protocol stack reassemble module executed at the main processing unit for converting the protocol stack into the packets; and
a LAN interface module executed at the main processing unit for selecting the idling voice processing unit and transmitting the packets and the corresponding unique IP address of the voice processing unit.

14. A method of communicating using a gateway system and a communication network for communicating PCM data with a remote system connected to the communication network, the gateway system having a plurality of voice processing units with each voice processing unit having a unique IP address; a HUB which is in communication with the plurality of voice processing units; and a main processing unit in communication with the plurality of voice processing units and the HUB, the main processing unit having a main IP address for communicating with the remote system, the method comprising the steps of:
preparing compressed data from the PCM data;
converting the compressed data into packets;
transmitting the packets to the main processing unit through the HUB; and
the main processing unit receiving the unique IP addresses of the plurality of voice processing units and the packets and converting the packets into a protocol stack for communicating on the communication network and using the main IP address in lieu of the unique IP addresses of the voice processing units in the protocol stack, wherein the main processing unit comprises:
a LAN interface module executed at the main processing unit for receiving the packets and the unique IP addresses from the plurality of voice processing units;
a protocol stack reassemble module executed at the main processing unit for converting the packet into the protocol stack; and
a router interface module executed at the main processing unit for transmitting the protocol stack to the communication network with the main IP address of the main processing unit.

15. The method of claim 14, wherein each one of the plurality of voice processing units uses G.723.1 standard protocol to compress the PCM data.

16. The method of claim 14, wherein each one of the plurality of voice processing units uses G.729 standard protocol to compress the PCM data.

17. The method of claim 14, wherein the packets are converted into the protocol stack using H.323 standard protocol.

18. The method of claim 14, wherein the plurality of voice processing units are in communication with the HUB using Ethernet connections.

19. A method of communicating using a gateway system and a communication network for communicating PCM data with a remote system connected to the communication network, the gateway system having a plurality of voice processing units with each voice processing unit having a unique IP address; a HUB which is in communication with the plurality of voice processing units; and a main processing unit in communication with the plurality of voice processing units and the HUB, the main processing unit having a main IP address for communicating with the remote system, the method comprising the steps of:

the main processing unit receiving the protocol stack with the main IP address from the remote system;

disassembling the protocol stack into packets;

selecting an idling voice processing unit and transmitting the packets with the unique IP address of the idling voice processing unit;

the idling voice processing unit converting the packets into the compressed data; and decompressing the compressed data into the PCM data, wherein the main processing unit comprises a central processing unit, a memory, a HUB interface device, a router interface device and a dual port memory connected to the central processing unit, and wherein the dual port memory is in communication with the plurality of voice processing units through the HUB and stores the unique IP addresses of the plurality of voice processing units.

20. The method of claim 19, wherein each one of the plurality of voice processing units uses G.723.1 standard protocol to decompress the compressed data into the PCM data.

21. The method of claim 19, wherein each one of the plurality of voice processing units uses G.729 standard protocol to decompress the compressed data into the PCM data.

22. The method of claim 19, wherein the protocol stack is converted into the packets using H.323 standard protocol.

23. The method of claim 19, wherein the plurality of voice processing units are in communication with the HUB using Ethernet connections.

* * * * *